United States Patent Office 3,171,870
Patented Mar. 2, 1965

3,171,870
POLYMER PROCESSING
Vernon H. Monteil and George Misko, Canoga Park,
Calif., assignors to North American Aviation, Inc.
No Drawing. Filed July 1, 1960, Ser. No. 40,132
13 Claims. (Cl. 264—3)

This invention relates to a method of processing polymeric materials. More particularly, this invention relates to a method of forming and curing a polymer-containing article.

Many polymeric compositions set up or undergo cure at relatively low temperatures. Such compositions are difficult to handle since quite often cure is effected in a space of time insufficient to permit casting of the material in a mold or to permit the use of the polymeric material in the preparation of other formulations. For example, polybutyl acrylic acid polymer containing 15 weight percent magnesium oxide cures very rapidly at room temperature so that it is difficult if not impossible, to thoroughly mix this polymeric material with a maximum amount of pigments such as titanium dioxide prior to a setting up of the polymer.

The problem of mixing solid components with a rapidly curing polymeric material is encountered in the preparation of solid rocket propellant grains. Composite solid propellants consist of solid oxidizers in particle form, such as, for example, ammonium perchlorate or ammonium nitrate, held together by a polymeric binder. The binder is composed of one or a combination of a number of thermosetting plastic or elastomeric compounds. Minor amounts of other ingredients are added to the rocket propellant grain mixtures as casting or extruding aids, burning rate catalysts, and curing catalysts. The solid rocket propellant grains are made by a number of methods. Some are pressed into molds at very high pressure to form the desired shape, some are extruded through dies, and others are cast by pouring a viscous mass into a mold with subsequent heat treatment.

Conventional methods of processing castable, composite solid grains require that large masses of hazardous mixtures be subjected to the kneading and blending operations of a mechanical mixer in order to disperse the solid particles throughout the binder material effectively. To facilitate the mixing process, the propellant is generally heated to some relatively high temperature, thus improving the mixing by a decrease of binder viscosity. This, however, increases the hazards of the operation. Most propellant systems require a very high amount, up to 90 percent by weight, of an oxidizer for a stoichiometric combustion mixture. Therefore, the propellant formulation with a high solids loading is more susceptible to local shear and frictional effects and is, consequently, more susceptible to ignition than a more fluid mixture lubricated by an excess of resin. The mixing of the solid components and a polymeric binder material is carried out for an appreciable length of time in order to obtain as uniform a composition as possible. The reaction rate for the polymerization of the binder is, therefore, an important factor. If the reaction is fairly rapid and exothermic, the "pot-life" or time during which the polymeric or resin mixture may be held in the mixing vessel becomes limited. The mixing operation must be completed before the propellant "sets up" or freezes in the mixture. When the propellant composition sets up in the mixer, a cutting, burning, or chipping out operation must be resorted to to remove it from the mixing vessel. A more disastrous outcome, however, is that the additional friction and heat produced by the setting up of the binder resin may cause detonation or deflagration of the mixture.

Casting operations, in the simplest form, consist of pouring a viscous mixed oxidizer and binder mass into a motor casing or mold and allowing it to settle into place. More elaborate refinements, such as vacuum-casting techniques, involve the introduction of the propellant into an evacuated mold through a series of small orifices. Vibration is often used in conjunction with the various casting techniques employed. In general, the success of the casting technique depends on the flow characteristics (viscosity) of the propellant mixture being cast. After casting, the propellant is placed in a curing oven for an extended period of time to complete the binder polymerization. The curing or polymerization is an exothermic process causing an increase in the internal temperature of any mass being cured. There is, then, the danger that the inner portion of the propellant grain may be raised above the auto-ignition temperature, and this does occasionally happen. However, even when spontaneous combustion or explosion is avoided, the inner composition of certain propellant grains is often heated to a temperature which causes deterioration of the propellant grain structure. This results in deformation of the grain or an impairment of its burning characteristics upon firing. It is thus seen that a need exists for an improved method of processing polymeric materials including resins and polymers which are loaded with solid particulate filling materials whether they be inert or of the oxidizer type used in propellants.

It is, therefore, an object of this invention to provide a novel method for processing polymeric materials. Another object is to provide a novel method for the manufacture of articles from polymeric materials. It is also an object of this invention to provide a novel method for processing a combination of polymeric materials or resins and solid particulate filling substances. Still another object is to provide a novel method for the fabrication of articles from a combination of polymeric materials or resins and solid particulate filling substances. Yet another object is to provide a process for the manufacture of particles from polymeric materials and resins which will minimize the possibility of thermal deterioration. It is also an object of this invention to provide a method for fabricating solid rocket propellant grains. Yet another object is to provide a method for fabricating articles from polymers and resins which are subject to cure at relatively low temperatures. It is also an object to provide a method for fabricating articles from polymeric materials and resins which undergo an exothermic curing reaction. Another object is to provide a method for removing heat from a polymer-containing composition undergoing a curing reaction. Another object is to provide a less hazardous method for processing certain explosive compositions. Still other objects of this invention will be apparent from the discussion which follows.

The above and other objects of this invention are accomplished by a process for the preparation of an article which is comprised of polymeric substances, comprising providing an article comprised of a polymeric material capable of forming a cohesive substance upon curing, subjecting an increment of said article while in an incompletely cured state to curing conditions and concurrently maintaining an adjacent increment of said article in a cure-inhibiting state. The non-limiting example of the process of this invention is the curing of an article cast of Neoprene Type W stock containing 0.1 part of magnesium oxide and 0.25 part of zinc oxide per hundred parts of neoprene. An article of Neoprene Type W stock containing volumes of carbon black is cured in a similar manner. An increment of the composition making up the cast neoprene rubber article is subjected to curing temperature while an adjacent increment is maintained in a cure-inhibiting state. In the case of a rod-shaped or cylindrical rubber article, incremental heating can be supplied by a ring heater which is heated by electrical means, and an adjacent increment of the composition can be maintained in a cure-inhibiting state by refrigeration means or some other cooling means which keeps the latter mentioned increment at a temperature below the curing point. The process is not restricted to any particular type of heating, such as a ring heater, nor to any particular type of refrigeration or cooling means. Thus, heating may be accomplished by placing the article on a plate heater maintained at a temperature sufficient to bring that portion of the article in contact with the plate to the curing temperature either directly or through some other heat-conducting material. Excess heat generated by the exothermicity of the curing reaction is removed by any suitable curing or refrigeration means, such as a cooling jacket on the outside of the article just above the heating plate. As a layer of the article is cured next to the plate, the cooling jacket or refrigeration means is moved a short distance away from the plate in order to allow another incremental layer of the article to cure. By maintaining the temperatures of the heating means sufficiently low so that just enough heat is supplied to bring the increment undergoing cure to the cure temperature, any excess heat generated during cure is taken up by the cooling or refrigeration means. In that manner, no heat is expended in heating up already cured segments of the article above the curing temperature and thermal deterioration is thus minimized. Another method employed in removing heat is to cool the article to a temperature sufficiently low so that when it is brought in contact with a heating means and a first increment of the article is heated up to the curing stage, the excess heat given off due to the exothermicity of the curing reaction is absorbed by a second increment of the article in bringing its temperature up to the curing stage, whereupon said second increment undergoes a curing reaction and the excess heat is taken up by a third adjacent increment, etc., until the entire article has been cured. This process is applied not only to articles having a continuous texture at the moment cure is initiated, but also to compositions in granular and/or particle form, as well as to compositions in granular and/or particle form which are converted to articles having a continuous texture while undergoing cure. This will become more apparent from the discussion and examples which follow.

Insulation and/or cooling or refrigerating means are made use of wherever necessary to maintain increments in a cure-inhibiting state. From the above, it is seen that while one increment of an article or composition is subjected to curing conditions, an adjacent increment of the same article is maintained in a cure-inhibiting state at a temperature sufficiently low to serve as a sink for the heat generated during the curing so as to prevent the increment undergoing cure from reaching a deterioration temperature.

The process of this invention is applicable to the manufacture or curing of any polymer-forming material or resin, both liquid and solid. Non-limiting examples of the materials which can be employed in the process of this invention include rubber, both natural and synthetic, resins, plastics, etc. Non-limiting examples of rubbers include butyl rubber, neoprene, nitrile rubber, styrene-containing rubbers, various polysulfide elastomers, acrylic elastomers, silicone rubbers, polyester rubbers, diisocyanate-linked condensation elastomers, butadiene copolymers, butadiene-styrene copolymers, etc. Examples of various rubbers may be found in various texts, including the text, "Synthetic Rubber," by Whitby, published by John Wiley and Sons, Inc., New York, and the text, "The Neoprenes," by Neal L. Catton, published by the Rubber Chemicals Division, E. I. duPont de Nemours Co. (Inc.), Wilmington, Delaware. Examples of various silicone resins are found in the text, "Introduction to the Chemistry of the Silicones," by Rochow, 2nd edition, 1951, published by John Wiley and Sons.

Both natural and synthetic resins may be used in the process of this invention. Non-limiting examples of synthetic resins include acrylic resins, acrylonitrile resins, alkyd resins, butadiene polymers and copolymers, epoxy resins, isocyanate resins, nylon resins, phenolic resins, phenol-formaldehyde resins, polyurethane resins, styrene polymers and copolymers, urea resins, vinyl polymers and copolymers, chlorinated rubbers, etc.

An embodiment of this invention, as stated hereinabove, is to maintain an increment of a composition which is in a cure-inhibiting state at a temperature sufficiently low to serve as a sink for heat generated by the increment undergoing cure, thereby preventing the latter increment from reaching a deterioration temperature. The temperature to which the increment in the cure-inhibiting state must be cooled can be readily determined by one skilled in the art from a knowledge of the heat of reaction upon cure, the heat capacity of the composition, and the temperature at which cure is initiated. Temperatures lower than the minimum calculated or determined by one skilled in the art can readily be used. When such cooler temperatures are employed, the result is that a thinner incremental layer of the article or composition undergoes cure at any one time since more heat is dissipated in heating up an increment from its cooled state to the curing state. The warming up process is accomplished not only by the heat given off in the curing reaction but also by the heat emanating from the heating source.

The article or composition can be cooled to a low temperature by any convenient means known in the art, such as refrigeration, by placing in a cold bath which may consist of a liquefied gas, or by direct mixing with a liquefied gas. In the case of direct contact with the cooling medium, the cooling medium should be inert towards the article or composition being cooled. Non-limiting examples of gases which can be used for cooling mediums upon lique-faction are nitrogen, neon, helium, methane, carbon monoxide, carbon dioxide, propane, butane, etc. Thus, temperatures as low as about −269° C. are obtainable.

Where the polymer material is in a liquid state prior to cure, it is cooled by lowering its temperature with suitable cooling means, or by mixing it directly with a liquefied gas. In the latter instance, the polymeric material freezes in the form of particles, the size of which are dependent to some degree upon the manner of stirring or mixing while cooling. When the particles are not of a suitably small size upon freezing of the polymeric material, they are reduced to finer dimension by any suitable means such as a ball-mill or mortar and pestle, while maintaining in the cold or frozen state. For example, di(thioethoxy)methylene is frozen into particles having an average diameter of about ⅛ inch by stirring the polymer with liquid nitrogen.

The frozen particles of polymeric material are next poured into a suitable mold and placed on a heated plate. Heat is conducted from the plate through the mold to the granular polymeric material. An incremental layer of the granular material in contact with that portion of the mold which is being heated is thawed out and is heated to the curing stage. When the granules thaw out, they form a continuous layer of liquid polymer. As the layer of liquid polymer undergoes cure, the heat given off therefrom is absorbed by an adjacent layer of particulate polymeric material which, in turn, is liquefied and reaches a curing state. In this manner, successive increments of polymeric material are thawed out of the granular state, form liquid layers, and proceed through the cure stage to form solid cohesive substances.

When the finished article is to contain solid components in the form of solid particulate filling substances distributed throughout the polymeric matrix, solid particulate filling substances such as carbon black, titanium dioxide, or other substances more fully described below, are added to the polymeric material either before or after the cooling operation. Where the particles are very fine and cooling is accomplished by direct contact with the liquefied gas, it is found preferable to add the solid substances to the polymeric material prior to cooling. This is especially true where the polymeric material is in liquid form. The reason for this is that very fine powders are difficult to cool by direct contact with a liquefied gas due to the large heat-conducting surface area of the small particles and consequent formation of large volumes of gases from the liquefied gas. For example, when the polymeric material is to contain aluminum powder, it is preferred to add the aluminum powder to the polymeric material prior to the cooling or freezing.

The process of this invention is found to be advantageous in the preparation of solid rocket propellant gains. The product obtained by this process not only is of a superior quality in that the moisture content and void volume are diminished, but also in that the danger of explosion during casting and curing is lessened, especially in the fabrication of grains of a large cross section.

In the preparation of a solid rocket propellant grain, the polymer or a precursor of the polymer, referred to hereinabove as a polymeric material, is usually in a partially polymerized form. Polymeric materials that are used in carrying out the process of this invention includes glycidyl polyethyl compounds of polyhydric alcohols and polyhydric phenols of the type described in U.S. Patents No. 2,767,157, 2,921,040, and 2,883,308. An example of such a polymeric material is one obtained by the reaction of a mole of 2,2-bis(4-hydroxyphenyl)-propane with one or more mols of epichlorohydrin in the presence of a base such as sodium hydroxide. This provides a glycidyl polyether composition having terminal epoxy groups. Another example of a polymeric material is cellulose. Still another example of a polymeric material is a polyurethane material such as a copoylmer of polypropylene glycol and toluene diisocyanate. A more specific example of a polypropylene glycol that is employed is one having an average molecular weight of about 2,050. The resultant prepolymer material has a structural formula

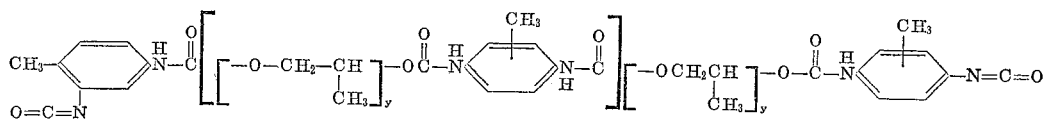

wherein $y$ is selected from the series 1, 2, 3 . . . and has a maximum value of about 10, and $y$ has an average value of about 35 in the case of a polypropylene glycol having an average molecular weight of about 2,050. The —NCO groups at the ends of the polymeric molecules are capped with a polyhydric alcohol such as, for example, glycerine, butandiol, hexantriol, castor oil, etc. In general, the polyurethane material is prepared by reacting polypropylene glycol and toluene diisocyanate in predetermined proportions in a reaction vessel. One example is the reaction of 2 mols of toluene diisocyanate with one mole of polypropylene glycol. The two react at room temperature. However, the temperature is usually raised to from about 200° F. to about 260° F. in order to accelerate the reaction. During the reaction, small samples are periodically withdrawn and the percent of —NCO groups determined by titration, and when the desired degree of reaction has been reached, that is, when the percent of —NCO groups has dropped to one-half its initial value, the end capping reactants are added in an amount equal to one mole of end-cap molecule-to-one mole equivalent of —NCO groups remaining uncombined. The reaction products constitute a prepolymer. The mole ratio of toluene diisocyanate-to-polypyropylene glycol can vary in the resin from 2:1 to about 1:1. As the ratio approaches 1:1 the prepolymer yields a final cured product which has a more resilient characteristic.

The number of unreacted —NCO groups is determined by adding a known excess of n-butyl amine and back titrating with HCl using a bromcresol green indicator.

In the casting of a rocket propellant grain in which oxidizer particles and polymers are mixed, a curing agent is also added. For the prepolymer just described, an isocyanate group-containing compound is used. An example of such a compound is polyphenylpolyisocanate. It is added to the composition in amounts sufficient to provide an OH to —NCO equivalent ratio of from about 2:1 to about 5:6. The OH groups are found on the prepolymer as a result of uncombined hydroxyl groups on the endcapper added, and the —NCO groups are introduced with the curing agent.

Polymeric products in which the ratio of OH groups in the prepolymer to —NCO groups of the curing agent added is 5:6 have the characteristic of high modulus, low elongation, relatively low resiliency, and high cross-link density. Polymeric products in which the ratio is 2:1 have a characteristic of more rubber-like quality with higher elongation, lower modulus, and low cross-link density. Ratios of 3:2 and 4:3 with intermediate properties are also obtained by controlling the amount of curing agent added. The above holds true for instances wherein the number of OH groups on a prepolymer molecule is at least 3 and the number of —NCO groups on the curing agent is at least 2. This is necessary in order that cross linking may occur.

Other polymeric materials that are employed in this process are silicone polymers and rubbers of the type described in a text entitled, "An Introduction to the Chemistry of the Silicones," supra. An example of a silicon polymer is a silicone gum obtained by heating a hydrolysate of a mixture of 90 mole percent dimethyldichlorosilane and 10 mole percent of diphenyldichlorosilane in the presence of a small amount of iron chloride. The composition is subjected to heating for a period of time sufficient to obtain a viscous liquid. Another polymeric material is a copolymer obtained by the reaction of a dihydrocarbon-substituted silanediol with a dihydrocarbon-substituted diisocyanatosilane. These are fully described in U.S. Patent No. 2,932,586, of the common assignee. Non-limiting examples of still other polymeric materials are polymers having the general formula $$HS(SR—O—CH_2—O—RS)_nSH$$

in which R is a saturated hydrocarbon group having from 1 to about 12 carbon atoms and $n$ is a number selected from the series 1, 2, 3 . . . , isocyanate resins having the general formula $$OCN—C_3H_6—O(C_3H_6—O)_n—C_3H_6—NCO$$

wherein $n$ is as defined above, and wherein the molecular weights of the polymers are from about 2,000 to about 3,000, and vinyl polymers. Other resins and polymeric substances that can be used will be apparent to those skilled in the art.

The solid substances with which the polymeric materials are loaded include inert pigments such as titanium dioxide, lead oxide, ferric oxide, carbon black; powdered metals and alloys such as copper leafing powder, aluminum flake, bronze powder; metal fluorides such as calcium fluoride and sodium fluoride; mica particles; asbestos fibers, glass fibers, fullers earth and other clay compositions, etc. When the solid particulate filling substances are oxidizing agents, as is the case in propellant compositions, they include metal perchlorates, metal nitrates, $NH_4ClO_4$, $NH_4NO_3$, etc. The amount of such substances in the composition varies from about 0.3 to about 90 weight percent.

The perchlorates employed as oxidizing agent or oxygen carriers in the composition are anhydrous and have the general formula $M(ClO_4)_x$, wherein M is $NH_4$ or a metal and $x$ is the valence of M. Since the propellant composition is required to withstand high temperature storage, it is preferable that the melting point and the decomposition temperatures of the oxidizer be as high as possible. The perchlorates of the Group I-A, Group I-B, and Group II-A metals are found to have the required high temperature stability and are employed in the preparation of propellant compositions by the process of this invention. Hence, the metal perchlorates used in the preparation of the propellant compositions include lithium perchlorate, sodium perchlorate, potassium perchlorate, rubidium perchlorate, and cesium perchlorate which are the perchlorates of the metals of Group I-A of the Periodic Table of Elements; silver perchlorate which is a perchlorate of a Group I-B metal; and magnesium perchlorate, calcium perchlorate, strontium perchlorate, and barium perchlorate which are the perchlorates of the Group II-A metals. In addition to the metal perchlorates, the compound ammonium perchlorate finds extensive use in propellant compositions.

Examples of the nitrates of the Group I-A, and I-B and II-B which are employed in preparing propellant compositions by the process of this invention are compounds such as lithium nitrate, sodium nitrate, potassium nitrate, magnesium nitrate, calcium nitrate, barium nitrate, strontium nitrate, etc. Ammonium nitrate is also used. The solid particulate substances have a particle size which ranges from about 1 to about 500 microns in diameter. In the case of solid particulate substances employed in rocket propellants, e.g. oxidizers, the particle sizes fall into two general classifications, fine and coarse. The fine particles range in size from about 1 to about 60 microns in diameter, while the coarse particles range in size from about 50 to 500 microns in diameter. The combination of the fine and coarse sized particles is employed in the casting of rocket propellants in order to obtain a maximum loading of oxidizer in the propellant grain. To accomplish this it is found that from about 25 to about 35 weight percent of the solids are fines and the balance are coarse.

The ratio of solids-to-polymeric binder material in a propellant falls in the range of from about 1:1 to about 9:1, with an optimum ratio of about 4:1.

Other substances which are employed in the preparation of propellants by the process of this invention include minor amounts of burning catalysts, well known in propellant compositions. These are composed of one or a mixture of two or more metal oxide powders in amounts sufficient to improve the burning rate of the composition. The amounts usually range from about 0.01 to about 3 weight percent, based on the weight of the oxidizer employed. The particle size of the powders can range from about 3 to about 250 microns in diameter. Non-limiting examples of metals that serve as burning catalysts are aluminum powder, aluminum flakes, aluminum fibers, lithium, copper, vanadium, chromium, silver, molybdenum, zirconium, antimony, manganese, iron, cobalt, and nickel. Examples of metal oxide burning catalysts are ferric oxide, copper oxide, chromic oxide, and copper chromates, as well as the oxides of the other metals mentioned above. Lithium hydride and other alkali metal hydrides are also used.

Burning depressants such as calcium oxalate, or other compatible materials which may serve as a heat sink by virtue of endothermic decomposition ahead of the advancing flame front may also be included in the preparation of solid propellant grains.

The solid particulate substances in some instances are added in the form of fibers, as well as in the form of powdered particles. The cross sectional diameter of fibers ranges from about 3 to about 250 microns.

Non-limiting examples of catalysts for the purpose of aiding cure include aluminum chloride, tris-trimethylsilyl borate, benzoyl peroxide, and other catalysts well known in the curing of plastics, resins, polymers, and rubbers. Examples of various catalysts may be found in text books such as "Synthetic Rubber," by G. E. Whitby, 892–933, 1954 ed., published by John Wiley and Sons, Inc., New York. The curing catalsyts are added in amounts of from 0.1 to about 10 weight percent, based on the weight of the polymer, resin, or elastomer, and preferably 0.1 to 6 weight percent.

Non-limiting examples of curing agents added to the polymeric material include polyamine and polyhydroxy compounds such as diethylenetriamine, triethylene tetraamine, diethanolamine and glycerine for cross-linking with diisocyanate compounds, epoxy resins for cross-linking with polyhydroxy compounds such as polypropylene glycol and with polycarboxy compounds such as polybutadiene-acrylic acid cooplymer, and sulfur for curing rubbers. Other curing agents will be readily apparent to one skilled in the art.

A component that is employed in the process of this invention is an oxidizer composition in which the oxidizer particles have been treated with an amine having the general formula

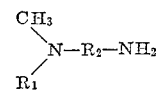

wherein $R_1$ is a member selected from the class consisting of hydrogen and hydrocarbon groups having from 1 to about 12 carbon atoms, and $R_2$ is a divalent hydrocarbon group having from 1 to about 12 carbon atoms. The hydrocarbon groups may be alkyl, alkenyl, aryl, alkaryl, arylkyl, and alicyclic. One example is an amine compound in which $R_1$ is hydrogen and $R_2$ is a methylene group. Another example is an amine in which $R_1$ is a methyl group and $R_2$ is a methylene group. Still another example is an amine in which $R_1$ is an n-dodecyl group and $R_2$ is a saturated hydrocarbon group containing 12 carbon atoms. A compound in which $R_1$ is cyclohexane and $R_2$ is a phenyl group is still another example. A method for the preparation of these amines is found in 38 J.A.C.S. 2141 (1916). In the treating process, from about 0.001 weight percent to about 30 weight percent amine is mixed with the oxidizer such as, for example, ammonium perchlorate. In the case of amines which are solids or semi-solids at ambient temperatures, as is the case where the hydrocarbon groups have a large number of carbon atoms, the mixture is heated during treatment. The amine passes in part or wholly into the crystal lattice of the oxidizer particles. The method of absorption is not known but it is postulated that the methyl groups penetrate the surface layer or layers of the ammonium perchlorate or other oxidizer particles, leaving the $NH_2$ groups free at the surface to react with the binder molecules when mixed with a polymeric composition. A non-limiting illustrative example is the mixing of 30 weight percent of amine having the general formula

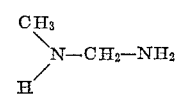

with 70 weight percent of ammonium perchlorate at a temperature sufficient to cause penetration into the crystal lattice of the ammonium perchlorate particles. Another example is the mixing of 0.001 weight percent of an amine having the formula

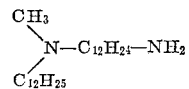

and 99.99 weight percent ammonium perchlorate, the mixture is heated to a temperature sufficient to bring about partial absorption of the amine onto the surface of the ammonium perchlorate particles. In like manner, the other amines having the general formula given above are absorbed onto the surface of solid particulate filling substances. The amine-treated solid particulate filling substances are then employed in the casting of polymeric mixtures in a rotating mold, as described hereinabove. The prepolymer used for this example is of such nature that the amine-treated surface of the oxidizer particles serves as the polymeric binder matrix. A non-limiting example of a suitable prepolymer is a compound of the formula

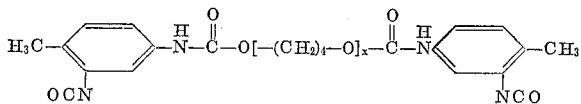

wherein $x$ is of a numerical value sufficient to yield a molecular weight of from about 400 to about 6,000.

Materials which are normally pyrophoric and are spontaneously combustible upon coming in contact with air are incorporated in some solid rocket propellant grains. An embodiment of this invention is to incorporate materials in the solid rocket propellant grain which are normally pyrophoric and are spontaneously combustible upon coming in contact with air. An example of this is pure aluminum powder or fibers having no oxide coating. A method of incorporating such materials is to first encapsulate them in a material such as polyethylene which is non-reactive with the pyrophoric substance. The process of encapsulating powders and fibers is well known in the art and is described in U.S. Patent No. 2,642,345, as well as in other technical publications. It is also an embodiment of this invention to incorporate materials which are non-compatible with the oxidizer or binding composition by first encapsulating them as described hereinabove. For example, lithium hydride is normally a pyrophoric powder which reacts with ammonium perchlorate. The lithium hydride powder is encapsulated in polyethylene and then employed as a component in the process of this invention as described in this writing.

An embodiment of this invention is to cast and cure a rocket propellant composition in a rocket motor casing. Rocket motor casings are made either of metal, such as steel, or glass-fiber reinforced plastic. Different plastics are employed for the motor casings. An example of one is the polymerized product of a glycidyl polyether having an epoxide equivalent of 190–210 obtained by the copolymerization of epichlorohydrin and 2,2-bis(4-hydroxyphenyl)propane.

The rocket motor casings can be lined with a material consisting of any plastic or rubber composition. The liner can contain an inert insulating material such as, for example, asbestos fibers, mica, diatomaceous earth, etc. Where the inert material is composed of asbestos fibers, the fibers are of a cross section of from about 5 to about 100 microns. To the naked eye the asbestos fibers appear as a powder. The amount of the inert insulating material in the binder layer varies from about 60 to about 85 weight percent. An example of a polymeric composition used as a case liner is polytetramethylene oxide glycol obtained by polymerizing tetrahydrofuran and then adding toluene diisocyanate to provide a molecular weight of the polymer molecules ranging from about 1,000 to about 4,000 according to the equation 1 to about 5 percent excess of —NCO groups. An example of another material employed for lining rocket motor cases prior to casting rocket propellant grains therein is a polybutadiene-styrene copolymer, polybutadiene-acrylic acid copolymer, etc. Such materials are well known in the art and will not be described further in this writing. Any of the rubber composition disclosed in the text, "Synthetic Rubber," supra, may be used as a linear composition. The liner materials are used with or without inert insulating materials such as asbestos, mica, diatomaceous earth, ect.

In appropriate formulations in the practice of this invention, curing agents are added separately and concurrently to the curing vessel or mold to provide for rapid curing in the carrying out of the process of this invention.

In general, in the preparation of a polymeric article containing solid particulate substances dispersed therethrough, such as a solid rocket propellant grain, in which the polymeric substances originally are in a liquid, incompletely cured form, one of the first steps involves the solidification or freezing of the liquid polymeric material or prepolymer, as it is often called. Solidification is usually accomplished by a direct contact with a liquefied gas ranging in temperatures from about 0° C. to about −269° C. The prepolymer thus becomes frozen. The freezing is accomplished either by adding the prepolymer to the liquefied gas or by adding the liquefied gas to the prepolymer with agitation as by stirring, shaking, tumbling, or other means. When the prepolymer is added to the liquefied gas, it may be sprayed into the cooling medium in order to obtain particles of a small diameter. The size of the solidified prepolymer particles can vary from about 1 micron to about ¼ inch in diameter. In some cases where the particulate filling substances are of a relatively large particle size, the diameter of the solidified prepolymer particles ranges from about 1 micron to about 100 times the size of the largest particles of filling substances. Another method of contacting the prepolymer with the liquefied gas is to extrude the polymer, especially when it is in a semi-solid form, into the cooling medium and chop or otherwise break up the extrusions into small particles. When the solidified prepolymer particles are not of the desired size, they are further comminuted by subjecting them to the action of a ball-mill or by grinding with a mortar and pestle, or any other operation which results in a reduction of the size of the particles. The instruments or machines are, of course, kept at a reduced temperature in order to maintain the solidified particles in a frangible state. In the case where the prepolymer has a very short pot-life either because of the nature of the polymer or on account of the curing agents added, the prepolymer composition should be solidified as soon as possible after the preparation thereof so as to retard the cure until all other components have been thoroughly mixed therewith. The prepolymer and the curing agent can be individually frozen prior to mixing.

The solid particulate filling substances which form a part of the finished article are preferably also chilled prior to addition or mixing with the solidified prepolymer. The chilling can be accomplished by any suitable operation, such as refrigeration of the container in which the solid particles are contained, or by direct contact with a liquefied gas which is inert to the particles. In the case of very fine powders, such as aluminum powder, which

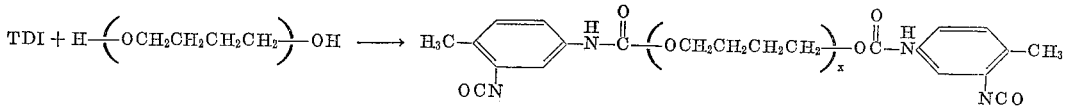

wherein $x$ is taken from the series 1, 2, 3 . . . to provide a weight of the portion in parentheses of up to about 2000. An amount of castor oil is then added on casting as the curing agent sufficient to provide one OH group for each —NCO group present, but to leave from about are added to solid rocket propellant compositions, it is sometimes preferable to mix the powder with the prepolymer prior to the solidification of the latter, as stated hereinabove. The aluminum powder employed has particles of a size within the range of from about 1 to about 100 microns, with an average particle size of about 15 microns.

An advantage of cooling the various components prior to mixing and/or casting or molding is that they are less subject to deterioration and explosive decomposition. For example, the process of this invention is used not only in the preparation of polymeric materials having solid particulate filling substances dispersed therethrough, but also in the preparation of polymeric materials having explosives such as nitroglycerin dispersed therethrough. Nitro-glycerin in the frozen state is less hazardous to handle, "Chemistry of Powder and Explosives," by T. L. Davis, published by John Wiley and Sons, Inc. Precautionary measures should be taken at all times in order to provide for the eventuality of an explosive decomposition during the carrying out of the process.

The solidified prepolymer composition with or without added particulate substances are next mixed with additional chilled solid particulate substances, if any, such as ammonium perchlorate oxidizer, by stirring, tumbling, or by turbulent contact of a plurality of liquefied gaseous streams containing the various components to be mixed dispersed therein. An example of the latter is a stream of liquid nitrogen containing ammonium perchlorate particles dispersed therein. The two streams are brought together in a manner calculated to provide turbulence at the junction and subsequent flow so that the dispersed components are thoroughly mixed. The mixing of the components can be accomplished in any suitable vessel. If desired, the mixing can be accomplished in the mold in which the composition is to be cast, such as a rocket motor casing.

The chilled and/or frozen components are added to the mold in the presence of a liquefied gas in one embodiment of this invention. In the case where the solidification and/or mixing is performed in the mold, some liquefied gas will undoubtedly be present at the end of the mixing operation. The excess liquefied gas is removed by decantation or by simply allowing it to vaporize.

The various components are maintained at a temperature sufficiently low to maintain the prepolymer components in a solidified state wherein they are relatively inactive insofar as undergoing further cure. The mixed components are then transferred to a suitable mold or a reaction vessel which can be a rocket motor casing. The mold or casing is preferably pre-chilled. In order to prevent the warming up and curing reactions going on at indiscriminate locations throughout the composition, it is preferred to maintain the mold or casing in a chilled condition by insulation or other means except in the area to be heated.

Heat is next applied to the mold or casing by the heating means in an amount and at a rate sufficient to heat only a layer of components adjacent to the heated area. Thus, only an increment of the solidified prepolymer and chilled solid components, if any are present, absorb heat over a given period of time. As the prepolymer particles absorb heat, they reach the melting point, become transformed into a liquid state of the type in which the prepolymer existed prior to solidification. In the liquid state, the prepolymer flows and forms a matrix about any solid particulate filling substances present. As the prepolymer undergoes cure, it solidifies to form a matrix containing dispersed solid particulate filling substances, if any are present, therein. If the heating is not too rapid, the transfer of heat to a second incremental layer of components is minimized. The first increment heats up to the curing stage and proceeds to undergo cure. The heat given off during the curing is absorbed by the second incremental layer, which in turn is heated up to the curing stage and then it proceeds to undergo cure. In this manner, successive increments of the components in the mold undergo cure and the heat given off during curing is taken up by the adjacent cold particles. If desired, the mold may be agitated from time to time by tapping or vibratory means in order to aid in the settling of the solid particulate prepolymer and filling substances as the curing process progresses.

As stated hereinabove, the surfaces of the mold other than that portion to which heat is applied, may require insulation or other methods of preventing the absorption of heat. Such other methods may be refrigeration or cooling methods. In the case where a mold has an open area through which the components are introduced, it is sometimes only necessary to shield those sides of the mold which are not being heated by external means. However, when the prepolymer undergoes a very rapid curing reaction upon being heated to the curing stage, it is preferable to place a heat-absorbing means on the surface of that portion of the components which is not in contact with the mold. This is done in order that the heat evolved during curing of the last increment, or multiple of increments, will be absorbed by the cooled heat-absorbing means. The heat-absorbing means, of course, should be chilled and having a sufficient heat sink capacity to prevent the temperature of the last increment or increments undergoing cure from reaching a deterioration temperature.

The process of this invention is used in casting polymeric substances with or without solid particulate filling materials even though the polymeric substances do not readily cure during the warming up of the successive incremental layers of composition in the mold. In this case, the successive incremental layers are warmed to the melting point of the prepolymer which then forms a matrix encompassing the solid particulate filling substances present, if any. When the prepolymer in the last incremental layer has melted and settled, the cast article is then subjected to curing conditions known in the art. This is an advantage over prior art methods of casting since the cooling down and solidification in the presence of liquefied gases serves to aid in diminishing the moisture content of the prepolymer and any solid fillers that are added. In addition, the cast article does not have a great preponderance of trapped air pockets or void volumes.

The process of this invention, which can aptly be called cryogenic processing, has many advantages over prior art methods. Ordinary casting and curing techniques requires the use of vacuum, vibration, and well-controlled ovens to produce satisfactory solid propellant grains. Cryogenic casting requires only an insulated mold and a controlled heat source at the bottom of a propellant mold to both cast and cure the propellant. Such a method of casting greatly diminishes the possibility of auto-ignition due to reaction heat because a heat sink is always available to the small amount of binder undergoing rapid polymerization at any one time. For this reason, it is possible to produce propellants by cryogenic processing which are very difficult or impossible to make by conventional means.

Cryogenic processing is much safer than prior art methods. One of the reason is that it is not necessary to work with or transport relatively warm or sensitive propellants. Another reason is that the frozen mixture at liquefied gas temperatures, such as, for example, liquid nitrogen temperatures, is a loosely mixed agglomeration which is much less susceptible to detonation than is the intimately dispersed propellant handled in conventional processing. A short pot-life of the polymeric binder is no longer a detriment in the casting of propellants or other solid-filled compositions since all resin ingredients are handled in the solidified or frozen state wherein the reaction rates approach zero. In fact, a very short pot-life, that is, a rapid cure characteristic at ambient temperatures, is an advantage in that it lends itself well to the use of the cast-cure cryogenic method. This holds true not only in propellant casting, but in the casting of any articles made of plastic or rubber, as well as in the casting of explosive formulations.

Another advantage of the cryogenic process of this invention is that the mixture can be held in the frozen state indefinitely until quality control tests have been run on portions of the mix to determine whether or not the composition needs to be varied prior to casting. For example, a small amount of the mixture can be used to mold a burning strand of propellant or to load a small rocket motor and the composition tested. Then, if the composition requires alterations, the necessary modifications can be made in the composition to obtain a propellant having the desired physical and chemical characteristics.

The cryogenic method of casting lends itself to the casting of solid rocket propellants at the launching site since rapidly curing binder compositions can be employed which cure without the necessity of employing complicated heating apparatus.

The process of this invention will be more fully illustrated in the examples which follow.

EXAMPLE I

A composition of Neoprene Type W stock containing 4 parts of magnesium oxide, 5 parts of zinc oxide, 1 part sulfur, and 2 parts of diphenyl guanidine per 100 parts of neoprene is cast into a mold and cooled to a temperature of substantially $-196°$ C. within about 10 minutes of its formulation in order to minimize loss in processing safety. Heat is then applied to the bottom of the mold and its contents so as to slowly raise the temperature of the incremental layer of neoprene stock in contact with the bottom of the mold to a temperature sufficient to bring about cure. Heating is continued at a slow rate and it is noted that the temperature of the mold and contents of each succeeding increment further removed from the heating means slowly warms up until finally the increment furthest removed from the heating means reaches the curing stage and is cured. No deterioration is found in the cured sample upon inspection.

Good results are also obtained when the procedure of Example I is repeated with Neoprene Type W stocks containing 1, 20, and 30 volume percent carbon black.

EXAMPLE II

To a vessel equipped with mixing means were added 27 parts of diethylenetriamine and 420 parts of an epoxide resin obtained by reacting 1,2,3-trihydroxypropane with a molar excess of epichlorohydrin and sufficient potassium hydroxide to combine with the reacted chlorine. The resin had an epoxide equivalent of 140–165 grams of resin per one gram equivalent of epoxide. The mixed composition was slowly added to a vessel containing liquid nitrogen. The addition was accompanied by stirring. Liquid nitrogen was maintained in the vessel until all of the composition was frozen. Due to the stirring action, the frozen composition was in particle form with the particles ranging in size from about 1 micron to about ¼ inch in diameter. The frozen composition was then transferred to a pre-cooled and insulated cylindrical mold. A chilled aluminum plate was placed on top of the granular frozen composition. The mold had no insulation on the end of the cylindrical mold which served as the bottom. The bottom of the mold was placed on a heating means and heat slowly applied. The composition slowly cured in the mold from the bottom up. When the chilled aluminum plate on top of the composition had heated up to the temperature of the mold adjacent the heating means, the contents of the mold were removed and sectioned. It was found that the molded article was cured throughout, having a colored, glass-like appearance. There were no inclusions observed.

The process of Example II is repeated with the modification that 1.4 parts of carbon black, equivalent to substantially 0.3 weight percent, is added to the composition. A product which is uniform in texture and color is obtained.

EXAMPLE III

The procedure of Example II is repeated a number of times, with the modification that the application of heat to the bottom of a cylindrical mold is discontinued after intervals of 15, 30, 45, and 60 minutes, and in each case the composition is removed from the mold and the degree of cure determined. It is found that in the time intervals stated, the cure has progressed to provide a cured portion 1, 2, 3, and 4 inches from the bottom of the mold where the heat is applied, while the balance of the composition remains in a frozen granular form with a layer of liquid resin substantially ⅛ inch thick at the interface between the cured portion and the frozen granular portion.

EXAMPLE IV

To the frozen composition described in Example I is added 500 parts of ammonium nitrate, 350 parts of ammonium perchlorate, and 1.4 parts of carbon black. The carbon black is added to prevent agglomeration of the frozen particles. The solid components are of a particle size within the range of from about 9 to about 500 microns. The solid particles are pre-chilled by immersion in liquid nitrogen. The chilled solids and frozen prepolymer particles are thoroughly mixed in the presence of liquid nitrogen. The mixture is then placed in a mold and cured as described in Example II. Upon sectioning of the cured composition, it is found to be of uniform and high density, and void-free. Strand burning rate test results are found to be the same as for the composition prepared by conventional mixing and curing methods. A rocket motor fired with the propellant of this example as fuel performs satisfactorily.

EXAMPLE V

The composition of Example III was mixed without freezing in a vessel equipped with mixing means. The composition was placed in a cylindrical mold at ambient temperatures and the molded contents placed in an oven maintained at substantially 190° F. for a period of 48 hours. The mold and contents were then cooled. Observation disclosed that the cast propellant grain had swelled at the axis, bulging out over one-quarter the radius measured from the center. The swollen or puffed out portion was substantially one inch longer than the rest of the grain. Sectioning of the grain showed spongy deterioration along the axis of the grain.

EXAMPLE VI

A 50–50 mixture by weight of the epoxide resin described in Example I and LP-3 polysulfide polymer was frozen as described in Example II. A description of the polysulfide liquid polymers is found in "Industrial Engineering Chemistry," volume 43, pages 324–328 (1951). Eighteen parts of the prepolymer composition was mixed with 82 parts of pre-cooled ammonium perchlorate. The ammonium perchlorate was made up of 70 weight percent coarse and 30 weight percent fine particles. The fine particles were of a size within the range of from 1 to about 60 microns in diameter and the coarse particles were of a size within the range of from about 50 to about 500 microns. The composition was placed in the mold and cured as described in Example II. The cured propellant grain was found to have set up so that the ammonium perchlorate particles were firmly held together by the polymer matrix. The propellant composition had a firm but resilient texture and high cohesive quality.

EXAMPLE VII

The procedure of Example VI is repeated with the modification that the ratio by weight of ammonium perchlorate to polymeric binder is substantially 9:1.

EXAMPLE VIII

The procedure of Example VI is repeated with the modification that the ratio by weight of ammonium perchlorate to polymer is substantially 1:1.

EXAMPLE IX

The procedure of Examples II and IV is followed in the preparation of a propellant grain containing substantially 28.5 parts of toluene diisocyanate, 7 parts of 1,2,6-hexanetriol, 142 parts of polypropylene glycol having an average molecular weight of substantially 2025, 540 parts of ammonium perchlorate made up of 70 weight percent coarse particles and 30 weight percent fine particles, 2 parts of carbon black, 220 parts of aluminum powder of a particle size which will pass through a 325 mesh screen, and 1.5 parts ferric acetylacetonate per 100 parts of liquid resin as a curing agent. Upon curing as described in Example II, the propellant composition is found to have a firm but resilient texture and high cohesive quality.

A prepolymer composition consisting of polypropylene glycol having an average molecular weight of substantially 400, and toluene diisocyanate in the molar ratio of 2:1 glycol-to-toluene diisocyanate, together with 21 weight percent polyphenylpolyisocyanate having substantially 1 isocyanate group per each phenyl group, and having an average molecular weight of substantially 360, is mixed with substantially 0.3 weight percent, based on the total weight of the composition, of titanium dioxide according to the procedure of Example IV, and the mixture poured into a mold and cured, as described in Example III. The procedure is modified to the extent that all solidification and freezing is accomplished by the use of liquefied butane. A good product is obtained.

EXAMPLE X

The procedure of Example IX is followed, employing 2 parts of a polypropylene glycol-toluene diisocyanate mixture in the mole ratio of 2:1, wtih one part of 1,2,6-hexanetriol and 15 weight percent polyphenylpolyisocyanate. The weight percent is based on the total weight of the composition. The frozen prepolymer is mixed with 50 weight percent asbestos fibers having a cross sectional diameter in the range of from 3 to about 250 microns, and 10 weight percent mica particles having a cross sectional diameter of from about 10 to about 300 microns. A good cured product is obtained.

EXAMPLE XI

The procedure of Example X is repeated with the modification that glyceryl ricinoleate is used in place of 1,2,6-hexanetriol, together with 15 weight percent triethylenetetramine as a curing agent. The frozen particulate polymer composition is mixed with 25 weight percent lead oxide, based on the total weight of the composition, and the composition cast and cured. A good product is obtained. The cooling and freezing in this example is accomplished by the use of liquid carbon dioxide.

EXAMPLE XII

The procedure of Examples II and IV is followed in preparing a composition of polybutyldiene-acrylic acid copolymer with a molar excess of the acrylic acid, and 15 weight percent magnesium oxide. The solidification of the polymeric material and subsequent mixing is carried out in the presence of liquid helium. A good product is obtained.

EXAMPLE XIII

The procedure of Example IV is repeated with the modification that 0.2 weight percent of copper chromate as a burning catalyst is added along with the solid components.

EXAMPLE XIV

The procedure of Example IX is repeated with the modification that the ammonium perchlorate employed contains 30 weight percent amine having the formula

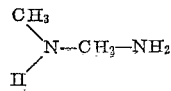

absorbed in the oxidizer crystals. When the propellant grain of this example is fired in a rocket motor it is found that the grain remains intact until combustion takes place and the chamber pressure and mass flow rate remain relatively constant.

EXAMPLE XV

The procedure of Example XIV is repeated with the modification that ammonium perchlorate is employed which has been treated with 0.01 weight percent amine having the formula

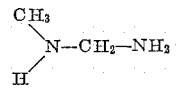

said weight being used on the weight percent of the amine and ammonium perchlorate combined. Upon curing, it is found that the prepolymer is partially converted to a three-dimensional polymeric matrix. Satisfactory performance is obtained when the propellant grain cast by the method of this example is fired in a rocket motor.

EXAMPLE XVI

The procedure of Example IX is repeated with the modification that pyrophoric aluminum encapsulated in 3 weight percent polyethylene is used in place of the normal aluminum powder. Upon curing, it is found that a good product is obtained. Satisfactory performance is observed when the propellant cast by the method of this example is fired in a rocket motor.

Other compositions employed in the process of this invention for casting solid rocket propellant grains as described in Example IV are shown in the following table.

Table I

| Composition No. | Percent by Weight | | | | | | |
|---|---|---|---|---|---|---|---|
| | 1 | 2 | 3 | 4 | 5 | 6 | 7 |
| NH$_4$ClO$_4$ coarse | 50.03 | 60.00 | 50.03 | 50.03 | | | 49.00 |
| NH$_4$ClO$_4$ Fine | 21.43 | 20.00 | 21.43 | 21.43 | | 20.00 | 21.00 |
| Para-quinone dioxime | 2.51 | 1.54 | 1.45 | 1.71 | 1.70 | | |
| Ferric oxide | 1.01 | | 1.01 | 1.01 | | | 1.00 |
| Sulfur | 0.45 | 0.03 | 0.49 | 0.15 | | | |
| Polymer A [a] | 24.57 | | 14.57 | 25.67 | | | |
| Diphenylguanidine | | 0.72 | | | 0.80 | | |
| Magnesium oxide | | 1.00 | | | | | |
| Polymer B [b] | | 16.71 | | | | | |
| Aluminum powder | | | 10.00 | | | 4.00 | |
| KClO$_4$ coarse | | | | | 54.00 | | |
| KClO$_4$ fine | | | | | 18.00 | | |
| Polymer C [c] | | | | | 25.50 | | |
| NH$_4$NO$_3$ granular | | | | | | 43.00 | |
| Epoxy resin D [d] | | | | | | 26.00 | |
| Dimethylamino methylphenol | | | | | | 1.00 | |
| Manganese oxide | | | | | | 4.00 | |
| Resin E [e] | | | | | | | 16.7 |
| Dioctyl Azelate | | | | | | | 9.8 |
| Methylene bis orthochloroanaline | | | | | | | 2.5 |

In the above table, the polymers A, B, and C are partially polymerized polymeric materials having the general formula

in which R is a hydrocarbon group having from 1 to about 12 carbon atoms and $n$ is a number selected from the series 1, 2, 3 . . . , to provide a polymer having an average molecular weight of from about 2,000 to about 3,000.

[a] In polymer A, the "R" in the above formula represents a C$_2$H$_4$ group and "$n$" has an average value of 6.
[b] In polymer B, "R" in the above formula represents a C$_4$H$_8$ aliphatic group and "$n$" has an average value of 6.
[c] In polymer C, "R" in the above formula represents a C$_2$H$_4$ group and "$n$" has an average value of 20.
[d] Epoxy resin D is a glycidyl polyether having terminal epoxy groups on each polymer molecule. It is obtained by copolymerizing equimolar quantities of epichlorohydrin and 2,2-bis(4-hydroxyphenyl)propane in the presence of a base such as sodium hydroxide to a product having a viscosity of substantially 1,000 centistokes.
[e] Resin E is a diisocyanate of a polyether of propylene glycol having the general formula

and having a molecular weight of from 2,000 to 3,000.

The testing performance of rockets containing propellant grains prepared by the process of this invention consisted of firing the rocket while anchored to a stand. The rocket was ignited by electrically actuating an igniter of a pyrotechnic composition placed in the firing chamber of the rocket. The pyrotechnic composition is composed of such material as black powder or a mixture of ammonium perchlorate and powdered metal such as aluminum, iron, magnesium, etc. The pressure generated within the firing chamber of the rocket is measured by means of a pressure pick-up. The thrust is measured by attaching the motor to a thrust cell which contains a strain gage adapted to indicate the magnitude of the thrust on an oscillograph to which it is connected. The rocket propellant composition, when tested in motors by this procedure, all give good results with respect to the combustion chamber pressure and thrust.

Rocket motors charged with propellant grains made by the process of this invention give good performance with respect to flight and range upon firing.

The process of this invention is equally applicable to the preparation of compositions comprising polymeric materials containing non-polymeric compounds dispersed therethrough. An example is the preparation of explosives from nitroglycerine and nitrocellulose, together with other components and in proportions well known in the art.

Although the invention has been described in detail, it is to be clearly understood that the same is by way of illustration and example only and is not to be taken by way of limitation, the spirit and scope of this invention being limited only by the terms of the appended claims.

We claim:

1. A process for the preparation of an article which is comprised of polymeric substances comprising providing a liquid polymeric material capable of forming a cohesive substance upon curing, solidifying said material in a cure-inhibiting frozen state, subjecting an increment of said solidified material to curing conditions and concurrently maintaining an adjacent increment of said solidified material in a cure-inhibiting state.

2. A process for the preparation of an article which is comprised of polymeric substances comprising providing a liquid polymeric material capable of forming a cohesive substance upon curing, solidifying said material in a cure-inhibiting frozen state, subjecting an increment of said solidified material to curing conditions and concurrently maintaining an adjacent increment of said solidified material in a cure-inhibiting state at a temperature sufficiently low for said adjacent increment to serve as a sink for heat generated during cure so as to prevent said increment undergoing cure from reaching a deterioration temperature.

3. A process for the preparation of an article which is comprised of polymeric substances comprising providing a liquid polymeric material capable of forming a cohesive substance upon curing, solidifying said material in a cure-inhibiting frozen state, mixing said solidified material with from about 0.3 to about 90 wt. percent solid particulate filling substances to form a mixed composition, subjecting an increment of said composition to curing conditions and concurrently maintaining an adjacent increment of said composition in a cure-inhibiting state.

4. A process for the preparation of an article which is comprised of polymeric substances, comprising providing a liquid polymeric material capable of forming a cohesive substance upon curing, solidifying said material in a cure-inhibiting frozen state to form solidified particles thereof, comminuting said solidified particles to form a comminuted material, mixing said comminuted material with from about 0.3 to about 90 wt. percent solid particulate filling substances to form a mixed composition, subjecting an increment of said composition to curing conditions and concurrently maintaining an adjacent increment of said composition in a cure-inhibiting state.

5. The process of claim 4, wherein said solidification and said comminuting is performed concurrently.

6. The process of claim 4, wherein said solidification is accomplished by contacting said liquid polymeric material with a liquefied gas which is substantially inert to said material.

7. A process for the preparation of an article which is comprised of polymeric substances comprising providing a liquid polymeric material capable of forming a cohesive substance upon curing, solidifying said material in a cure-inhibiting frozen state by contacting same with a liquefied gas inert to said material and having a boiling point lower than the solidification temperature of said material, mixing said solidified material with from about 0.3 to about 90 weight percent of a solid particulate filling substance which has been cooled to substantially the temperature of said solidified material to form a mixed composition, subjecting an increment of said composition to curing conditions and concurrently maintaining an adjacent increment of said composition in a cure-inhibiting state.

8. A process for the preparation of an article which is comprised of polymeric substances comprising providing a liquid polymeric material capable of forming a cohesive substance upon curing, solidifying said material in a cure-inhibiting frozen state by contacting same with a liquefied gas inert to said material and having a boiling point below the solidification temperature of said material, casting said composition into a mold, subjecting increments of said cast composition to curing conditions by the application of heat, and concurrently maintaining adjacent increments of said cast composition in a cure-inhibiting state.

9. A process for the preparation of an article which is comprised of polymeric substances comprising providing a liquid polymeric material capable of forming a cohesive substance upon curing, solidifying said material in a cure-inhibiting frozen state by contacting same with a liquified gas inert to said material, and having a boiling point below the solidification temperature of said material, mixing said solidified material with from about 0.3 to about 90 wt. percent of a solid particulate filling substance which has been cooled at least to substantially the solidification temperature of said solidified material to form a mixed composition, casting said mixed composition into a mold, subjecting successive increments of said cast composition to curing conditions by the application of heat, and concurrently maintaining an adjacent increment of said cast composition in a cure-inhibiting state.

10. A process for the preparation of an article which is comprised of polymeric substances having solid particulate filling matter dispersed therethrough, comprising providing a liquid polymeric material in a cure-inhibiting state capable of forming a cohesive substance upon curing, solidifying said material by contacting same with a liquified gas inert to said material and having a boiling point below the solidification temperature of said material, mixing said solidified material with a solid particulate filling substance which has been cooled at least to substantially the solidification temperature of said solidified material to form a mixed composition, said filling matter consisting essentially of at least one component selected from the class consisting of carbon, asbestos fibers, powdered metals, powdered metal alloys, metal fluorides, metal oxides, inorganic perchlorates having the general formula

$$M(ClO_4)_x$$

wherein M is selected from the class consisting of $NH_4$, Group I–A metals, Group I–B metals, and Group II–A metals of the Periodic Table of Elements, and $x$ is the valence of M; and ammonium nitrate, Group I–A metal nitrates, Group I–B metal nitrates, and Group II–B metal nitrates, wherein the ratio by weight of said solid matter to said polymeric material is from about 0.3:99.7 to about 9:1, casting said mixed composition into a mold, subjecting successive increments of said cast composition to curing conditions by the application of heat and concurrently maintaining an adjacent increment of said cast composition in a cure-inhibiting state.

11. The process of claim 10 wherein said solid particulate filling substance is ammonium perchlorate.

12. A process for the preparation of an article which is comprised of polymeric substances comprising providing a mixture of a liquid polymeric material capable of forming a cohesive substance upon curing together with solid particulate filling substances dispersed therein in the weight ratio of from about 0.3:99.7 to about 9:1 of said filling substances-to-polymeric material, solidifying said mixture in a cure-inhibiting frozen state, subjecting an increment of said solidified mixture to curing conditions and concurrently maintaining an adjacent increment of said solidified mixture in a cure-inhibiting state.

13. A process for the preparation of an article which is comprised of polymeric substances comprising providing a mixture of a liquid polymeric material capable of forming a cohesive substance upon curing together with solid paticulate filling substances dispersed therein, solidifying said mixture in a cure-inhibiting frozen state, mixing said solidified mixture with additional solid particulate filling substances to form a mixed composition wherein the weight ratio of filling substances-to-polymeric material is from about 1:99 to about 9:1, subjecting an increment of said mixed composition to curing conditions and concurrently maintaining an adjacent increment of said composition in a cure-inhibiting state.

References Cited in the file of this patent
UNITED STATES PATENTS

| | | |
|---|---|---|
| 1,739,761 | Kleinfeldt | Dec. 17, 1929 |
| 2,057,674 | Fields | Oct. 20, 1936 |
| 2,136,422 | Fields | Nov. 15, 1938 |
| 2,136,423 | Fields et al. | Nov. 15, 1938 |
| 2,136,424 | Fields et al. | Nov. 15, 1938 |
| 2,168,331 | Fields et al. | Aug. 8, 1939 |
| 2,187,146 | Calcott et al. | Jan. 16, 1940 |
| 2,307,371 | Hileman | Jan. 5, 1943 |